2,682,987

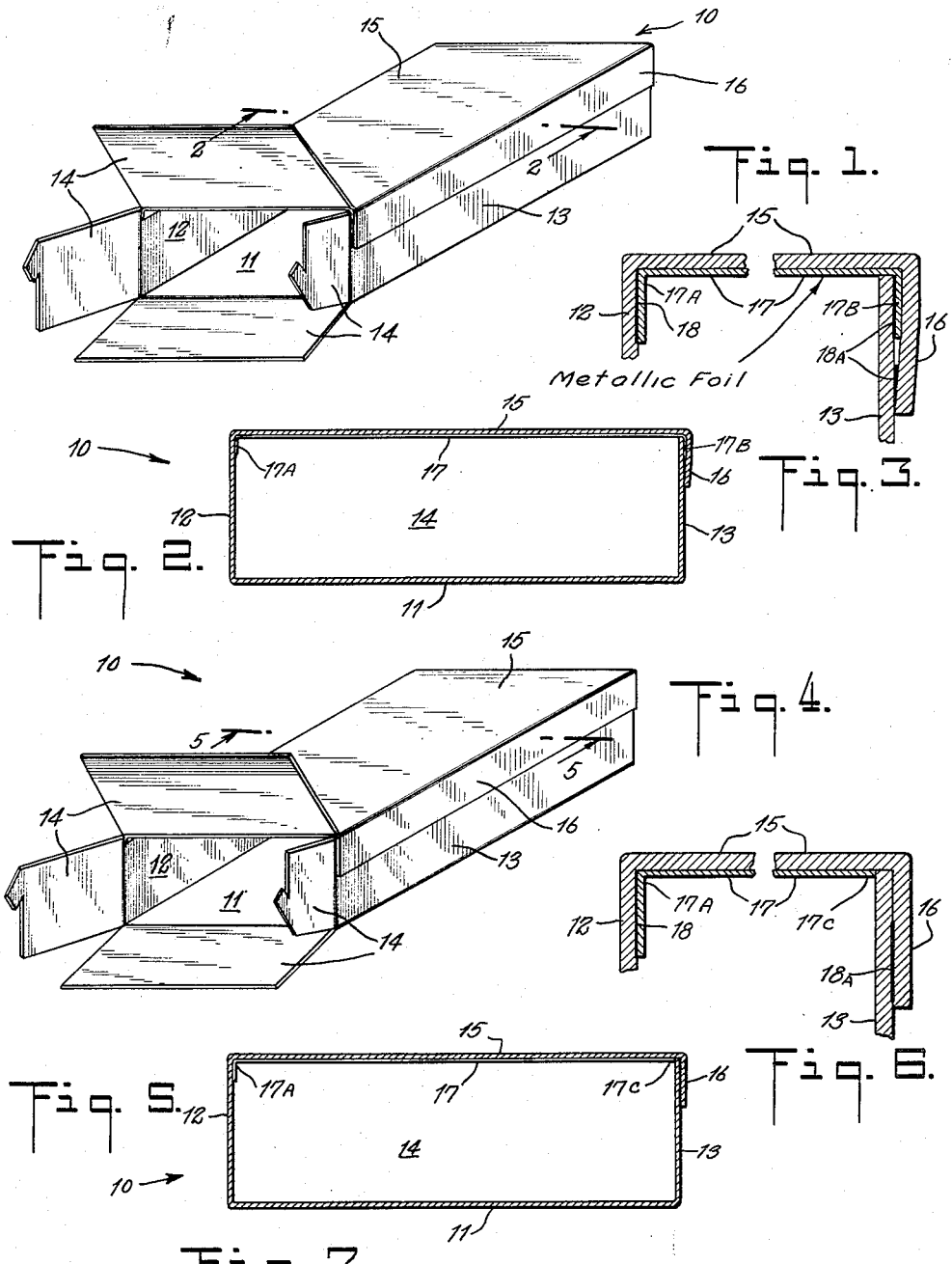
July 6, 1954 — N. E. SPIESS, JR — 2,682,987
CONTAINER FOR FROZEN PRODUCTS
Filed Dec. 4, 1948
INVENTOR.
NEWTON E. SPIESS, JR.
BY Campbell, Brumbaugh, Free & Graves
ATTORNEYS Patented July 6, 1954

UNITED STATES PATENT OFFICE 2,682,987

CONTAINER FOR FROZEN PRODUCTS

Newton E. Spiess, Jr., Oakdale, N. Y., assignor to National Dairy Research Laboratories, Inc., Oakdale, Islip, N. Y., a corporation of Delaware Application December 4, 1948, Serial No. 63,508

2 Claims. (Cl. 229—14)

This invention relates to cartons or containers for ice cream, ices, sherbets, frozen desserts, or other frozen products, and more particularly, to containers, the structure of which facilitates storage of the contents thereof in the freezing compartments of domestic refrigerators conveniently and while preserving the contents in a desired state of refrigeration.

In marketing ice cream and other frozen food products, the conventional paper container has been found satisfactory for a number of reasons. One of these is the relatively low thermal conductivity of the paper which retards the transfer of heat from the surroundings to the frozen product within the carton or container while the product is being carried or delivered from the point of purchase to the consumer's residence, or being otherwise handled outside the deep freeze cabinet, thereby causing the frozen product to be received in better condition than if it had been packed in a container of metal foil or other material of high thermal conductivity. The use of the conventional paper carton is satisfactory if the ice cream is to be consumed immediately.

Frequently the consumer desires to keep the frozen product for a number of hours before use by storing the original carton in the freezing compartment of a domestic refrigerator. For this purpose the conventional paper container is not satisfactory. I have observed that ice cream and other frozen products packed in the conventional type of paper container very often cannot be kept in good condition in the freezing compartment of a domestic type refrigerator unless the temperature control is set to such an excessively low temperature that milk and other foods in the refrigerator may become frozen.

An object of this invention is to provide a carton or container for ice cream or other frozen products which can be handled and transported without excessive melting or softening of the frozen contents, and which is also well adapted for maintaining the best possible condition and quality of its contents when stored in the freezing compartment of a domestic refrigerator.

I have discovered that a container with the required properties for handling and delivery, and storage in a refrigerator may be made of paper or any other similar material which is a relatively poor thermal conductor to provide insulation for the sides exposed to the relatively warm air within the freezing compartment space, with one or more of its sides formed of metallic foil having a relatively high thermal conductivity to provide effective heat transfer between the contents of the container and the surface of the freezing compartment upon which the foil rests. If desired, the container may be provided with a covering for the foil which may be readily removable to expose the metallic foil. When the covering is so removed, the package may be placed with the foil in intimate contact with the refrigerating surface of the compartment, thereby permitting a ready thermal exchange between said freezing surface and the contents of the package. A suitable metallic foil is aluminum, but foils of other metals or alloys or any good thermal conductor may be used.

The advantages of the invention will be readily apparent when consideration is given to the lower relative temperature of the refrigerating surface of the freezing compartment of a mechanical refrigerator compared with the temperature of the air in such a compartment. I have found that in the case of a typical household mechanical refrigerator the temperature of the refrigerating surface of the freezing compartment may vary from about +7.0° F. immediately after the refrigeration turns off to about +17.0° F. immediately before the refrigeration turns on, while the temperature of the air in the compartment at such times, respectively, may vary from about +24.5° F. to 25.5° F. Ice cream, for example, may be kept at a proper degree of hardness within the range of the temperatures shown for the refrigerating surface of the freezing compartment, but not at the higher temperatures of the air in such compartment. By providing a good direct thermal contact between the product to be refrigerated and the refrigerating surface of the freezing compartment on the side of the package having exposed metallic foil, and a poor thermal contact or insulation between the product and the air of higher temperature in the freezing compartment on the other sides of the package (covered or constructed of paper or other material of relatively low thermal conductivity), the product can be kept within the range of temperatures of such refrigerating surface, giving the desirable effects mentioned.

Other objects and advantages of the invention will be apparent from the following detailed description and from the accompanying drawings, wherein Figure 1 is a perspective view of a container constructed in accordance with the present invention;

Figure 2 is a view in cross-section of the container of Figure 1, taken on line 2—2 and looking in the direction of the arrows;

Figure 3 is an enlarged view showing the liner construction of Figure 2;

Figure 4 is a perspective view of another container constructed in accordance with the present invention;

Figure 5 is a view in cross-section of the container of Figure 4, taken on line 5—5 and looking in the direction of the arrows;

Figure 6 is an enlarged view showing the liner construction of Figure 5; and

Figure 7 is a view in end elevation showing the container of Figure 1 positioned on a refrigerated surface.

Referring now to Figures 1, 2 and 3, a container 10 is shown which comprises a bottom wall 11, back wall 12, front wall 13, end walls 14, and hinged top wall 15 having a flap 16 associated therewith. The back, front and end walls comprise the container sides and, together with the bottom wall define a product space of predetermined shape adapted to be covered by the top wall. In a typical embodiment, these component parts identified by the reference numerals 11 through 16 inclusive may be stamped from a single piece of any suitable material, such as paperboard, for example, and then formed in a conventional manner into the shape of a container.

A thin sheet of a metallic material 17, preferably aluminum foil ranging in thickness from 0.00035 to 0.008 inch, covers the inner surface of the top wall or panel 15, a margin 17A thereof being affixed as by gluing 18 to the back wall 12. The margin 17B is glued to the outer surface of the front wall 13 to prevent the foil 17 from sagging during the filling operation, and flap 16 is placed thereover and glued at 18A to the front wall 13 beyond the edge of the foil 17.

Figures 4, 5, and 6 illustrate a modified arrangement for affixing the foil 17 in the container 10. One margin 17A is glued at 18 to a small portion of the inner surface of the back wall 12, as described previously, and the margin 17C extends to the inner surface of the front wall 13. In this form of container, the foil member 17 should preferably be hard drawn to assure greater stiffness when the container 10 is filled.

In use, the top wall 15 of the container 10 is removed therefrom and the exposed surface of aluminum foil 17 is placed upon a refrigerated surface 20 having the freezing coils 21 retained thereagainst by a plate member 22, as illustrated in Figure 7. By using a container having this novel structure, the consumer can readily and easily store frozen products in a conventional refrigerator and at the same time, retain the products in a more attractive and harder condition.

From the foregoing it will be apparent that the present invention provides a simple and inexpensive, yet effective, container for maintaining a frozen product in a desired condition. Further, the paperboard structure affords effective insulation when the product is out of a refrigerated area and insulates the five sides that are out of contact with the refrigerated surface from the relatively warm air of the refrigerating compartment, as hereinabove mentioned.

It is to be understood that the particular size and shape of the container or containers is immaterial insofar as the present invention is concerned. Moreover, the manner of gluing or otherwise securing the foil within the container or to adjacent container walls may be varied as desired, and the particular container wall of which the foil forms a component part may be varied as well as the extent of wall area covered by the foil without departing from this invention as defined in the appended claims.

I claim:

1. A container for a frozen product which is to be kept solidified, the container being adapted to be convertible between a first form having good thermal insulating properties throughout and a second form having a heat-transferring portion, the container including first and second spaced-apart and opposed parallel wall portions, end and bottom wall portions all of material of low thermal conductivity, said parallel wall portions and end and bottom wall portions defining a product-receiving space of predetermined shape, a cover portion hinged to said first wall portion and of the same material, the cover portion comprising a top panel for the container adapted to bridge the distance between the first and second wall portions and between the end wall portions and having a free edge adapted to be detachably secured to the outer surface of the second wall portion, and a sheet of metallic material of high thermal conductivity having a first portion attached to the inner surface of the first wall portion, said sheet of metallic material overlying a relatively small part of the first wall portion, a flat, single-layer second portion normal thereto underlying the cover portion throughout substantially the entire panel area whereby removal of the cover portion exposes the sheet of metallic material to enable the latter to be disposed in heat-exchanging contact with an external surface for facilitating thermal exchange between the said external surface and the contents of the container, whereby the thermal exchange between the product and the external surface may include heat flow through the sheet of metallic material both at right angles thereto and in the plane thereof.

2. A container for a frozen product which is to be kept solidified, the container being convertible between a first form having good thermal insulating properties throughout and a second form having a heat transferring panel covering substantially an entire surface of the container, the container comprising bottom and side walls of a material of relatively low thermal conductivity and defining a product-receiving space of predetermined shape, the top wall of the container comprising over substantially its entire area a flat panel formed of a metallic sheet material of relatively high thermal conductivity, the inner surface of the metallic panel being adapted to engage the product and the outer surface to engage an external heat exchanging surface, and cover means of relatively low thermal conductivity detachably secured to the container and adapted to overlie the entire top wall as defined by the metallic panel, whereby with the cover in place the contents are fully insulated and with the cover removed and the container placed with the metallic panel opposing the external surface, heat exchange may be effected from the product to the external surface by means of heat transmission through the metallic panel both at right angles and parallel to its surfaces, thereby to effect heat transfer in the absence of complete surface contact between the external surface and the metallic panel.

References Cited in the file of this patent

UNITED STATES PATENTS

| Number | Name | Date |
|---|---|---|
| 124,459 | Thurston | Mar. 12, 1872 |
| 1,027,924 | Starr | May 28, 1912 |
| 1,341,403 | Wilkinson | May 25, 1920 |
| 1,704,175 | Coale | Mar. 5, 1929 |
| 1,759,682 | Birdseye | May 20, 1930 |
| 1,782,120 | Funke | Nov. 18, 1930 |
| 1,965,769 | Kraft | July 10, 1934 |
| 2,120,258 | Moore | June 14, 1938 |
| 2,200,818 | Bergstein | May 14, 1940 |
| 2,241,710 | Lowey | May 13, 1941 |
| 2,284,604 | Brooks | May 26, 1942 |
| 2,296,664 | Hall | Sept. 22, 1942 |
| 2,305,371 | Yates | Dec. 15, 1942 |
| 2,364,576 | Waters | Dec. 5, 1944 |